May 17, 1966   K. E. G. BRACEY   3,251,421
ROTOR MEMBER FOR A ROTARY WING AIRCRAFT
Filed Jan. 4, 1965   2 Sheets-Sheet 1
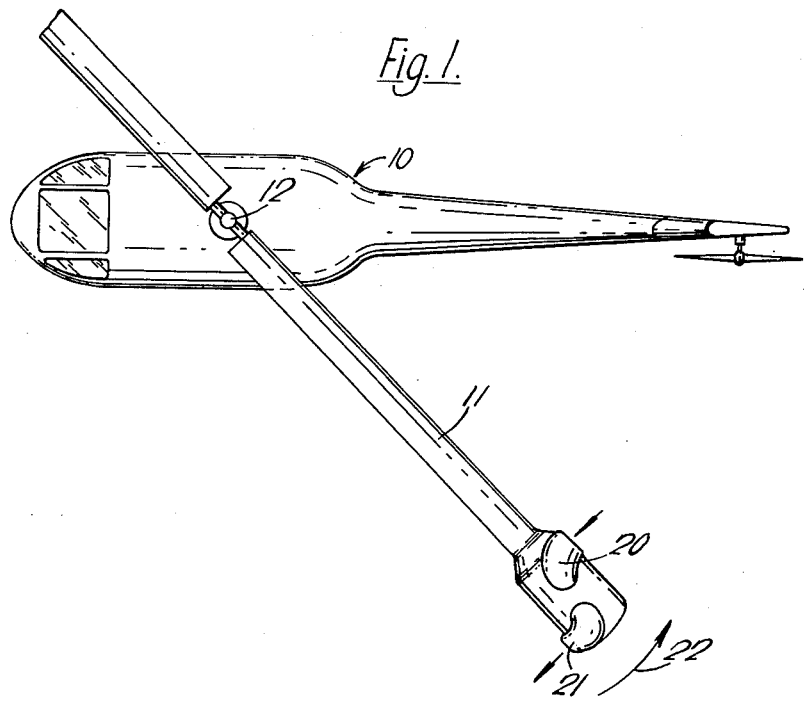
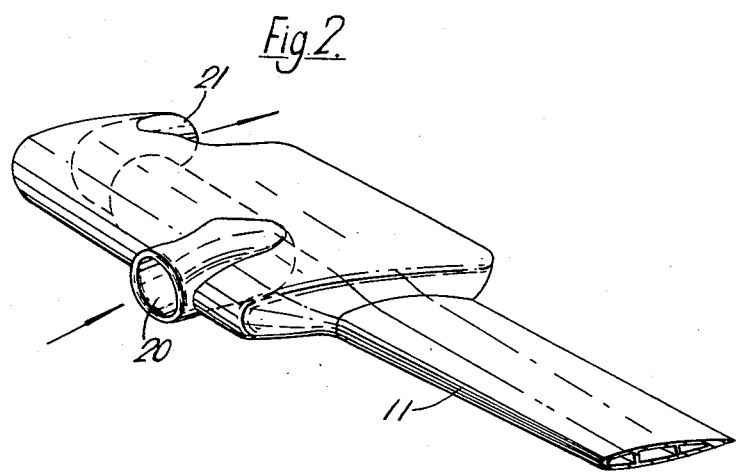

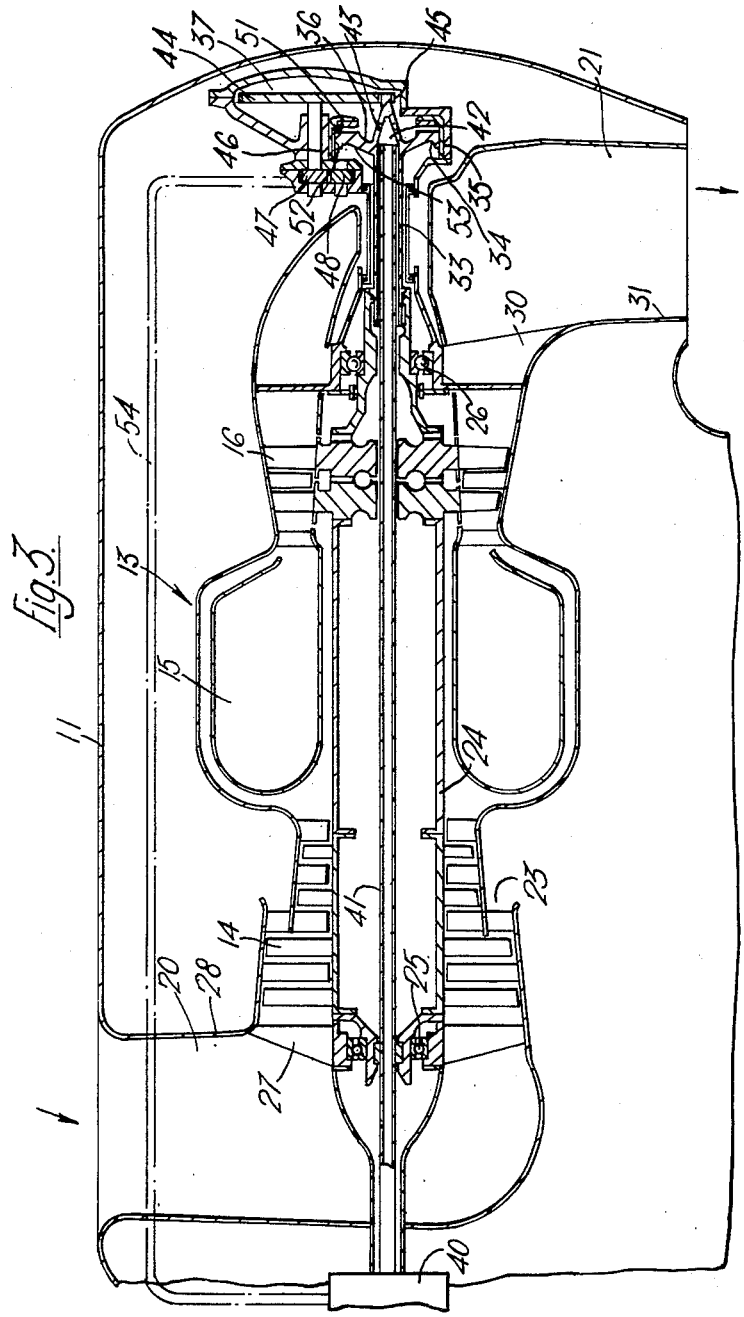

United States Patent Office 3,251,421
Patented May 17, 1966

3,251,421
ROTOR MEMBER FOR A ROTARY WING AIRCRAFT
Kenneth Edward George Bracey, Indern, England, assignor to Rolls-Royce Limited, Derbyshire, England, a company of Great Britain
Filed Jan. 4, 1965, Ser. No. 423,028
Claims priority, application Great Britain, Jan. 22, 1964, 2,872/64
5 Claims. (Cl. 170—135.4)

This invention concerns a rotor member, and although the invention is not so restricted, it is more particularly concerned with a rotor member for a rotary wing aircraft such, for example, as a helicopter.

According to the present invention, there is provided a rotor member having a radially inner part about which the rotor member is adapted to be rotated, a gas turbine engine which is arranged to rotate the rotor member and which is carried by a part thereof which is radially spaced from said inner part, the gas turbine engine having compressor means and turbine means which are mounted on common shafting, said common shafting being rotatably mounted in bearings which are carried by the rotor member and which are spaced apart from each other radially of the rotor member.

Since the common shafting extends radially of the rotor member, by virtue of being mounted in bearings which are spaced apart from each other radially of the rotor member, the centrifugal force to which the common shafting is subjected when the rotor member is rotated will not cause the common shafting to become bent, nor will it cause the said bearings to be subjected to a heavy load.

Preferably, means are provided for subjecting the common shafting to a compensating force which is opposed to the centrifugal force to which the common shafting is subjected when the rotor member is rotated.

Thus, the said means for subjecting the common shafting to a compensating force preferably comprises a cylinder having a piston which is slidably mounted therein and which is connected to the said common shafting for longitudinal movement therewith, means being provided for supplying said cylinder on the side of said piston remote from said common shafting, with a pressure fluid.

The last-mentioned means preferably supply the said cylinder with a pressure fluid whose pressure, at any moment, is functionally related to the value of the centrifugal force at that moment. Thus the last-mentioned means may comprise a chamber which is adapted to contain a pressure fluid and which is integral with or communicates with said cylinder, and a rotatable part which is rotatably mounted in said chamber and which is driven by said gas turbine engine.

Means may be provided for limiting the value of the said compensating force. Thus, the said cylinder may have a vent port through which the pressure fluid may escape, the vent port being uncovered by the piston when the latter has moved to a predetermined position in the cylinder. The vent port preferably communicates with the side of said piston adjacent said common shafting.

The said rotatable parts may drive a scavenge pump which withdraws pressure fluid which has passed through said vent port.

The rotor member may be a rotor blade, e.g. of a rotary wing aircraft.

The invention also comprises a rotary wing aircraft provided with a plurality of such rotor blades.

The invention is illustrated, merely by way of example, in the accompanying drawings, in which:

FIGURE 1 is a plan view of a helicopter having rotor blades in accordance with the present invention, FIGURE 2 is a perspective view of the radially outer part of one of the said rotor blades, and FIGURE 3 is a broken-away sectional view of part of the structure shown in FIGURE 2.

Referring to the drawings, a helicopter 10 is provided with rotor blades 11, the radially inner end of each of which is mounted for rotation about a mast 12.

The rotor blades 11 are arranged to be rotated by gas turbine by-pass engines 13 (see FIGURE 3), each of which is mounted adjacent the tip of the respective rotor blade 11.

Each of the gas turbine engines 13 comprises in flow series a compressor 14, combustion equipment 15, and a turbine 16, the engine having an inlet duct 20 which extends from the leading edge of the respective blade 11, and an exhaust duct 21 which extends to the trailing edge of the respective rotor blade 11. Thus, as indicated by the arrow 22 in FIGURE 1, the jet gases passing out of the exhaust ducts 21 cause the rotor blades 11 to rotate counter-clockwise about the mast 12.

Part of the compressed air which has been compressed by the compressor 14 of each engine passes through a by-pass duct 23. The by-pass air flowing through the said by-pass duct 23 assists in silencing the noise created by the jet efflux from the exhaust duct 21.

The compressor 14 and turbine 16 of each engine are mounted on common shafting 24. The common shafting 24 extends radially of its rotor blade 11 and is rotatably mounted in ball bearings 25, 26 which are spaced apart from each other radially of the respective rotor blade 11. The bearing 25 is carried by a plurality of angularly spaced apart struts 27 which extend from an outer casing 28 of the engine, the outer casing 28 being mounted securely within the rotor blade 11.

The bearing 26 is carried by a plurality of angularly spaced apart struts 30 which extend to an inner casing 31 of the engine. The bearings 25, 26 have some freedom of movement so that the shafting 24 can move axially to some extent.

A sleeve 33 is connected to the radially outer end of the common shafting 24 for longitudinal and rotary movement in unison therewith.

The sleeve 33 is provided, adjacent its end remote from the common shafting 24, with a piston 34 which is slidably mounted in a cylinder 35. The cylinder 35, on the side 36 of the piston 34 remote from the common shafting 24, communicates with a chamber 37.

An oil tank 40 is mounted in each of the rotor blades 11 and communicates with a pipe 41, the latter being mounted concentrically within the common shafting 24 and extending through the greater part of the sleeve 33. Oil from the oil tank 40 passes through the pipe 41 to a conical chamber 42 within the part of the sleeve 33 remote from the common shafting 24. The chamber 42 communicates by way of drillings 43 with the chamber 37.

Mounted within the chamber 37 is a gear 44 which meshes with external gear teeth 45 at the end of the sleeve 33 remote from the common shafting 24. The gear 44 is thus driven by the sleeve 33 and hence by the common shafting 24.

The gear 44 drives a shaft 46 which itself drives a gear 47 of a gear pump 47, 48.

The cylinder 35 has a vent port 51 which communicates, by way of a passage 52, with the side 53 of the piston 34 adjacent the common shafting 24. The vent port 51, through which pressure fluid from the chamber 37 may escape, is arranged to be uncovered by the piston 34 when the latter has moved to a predetermined position in the cylinder 35.

The gear pump 47, 48 constitutes a scavenge pump which withdraws oil which has passed through the vent port 51 and passes it through a pipe 54 back to the oil tank 40.

In operation, the jet effluxes from the exhaust ducts 21 of the engines 13 cause counter-clockwise rotation of the rotor blades 11 about the mast 12. Since the engines 13 are mounted adjacent the tips of the rotor blades 11, the common shafting 24 of each engine 13 will be subjected to considerable centrifugal force. This centrifugal force will, however, be directed longitudinally of the common shafting 24 and will not, therefore, exert any bending moment on the common shafting 24, nor will it subject the bearings 25, 26 to a heavy load.

The rotation of the common shafting 24 of each engine 13 will, moreover, effect rotation of the gear 44 which drives the scavenge pump 47, 48 whereby scavenge oil is returned from the chamber 37 to the oil tank 40. The rotation of the respective rotor blade 11, moreover, will cause oil from the oil tank 40 to be centrifuged into the chamber 37. The pipe 41 is made of such length that when the rotor blade 11 is rotating, a centrifugal pressure head is generated which is sufficient to ensure that the oil pressure in the chamber 37 is related at all rotor blade speeds to the centrifugal force to which the common shafting 24 is subjected, whereby to achieve equilibrium of the latter.

That is to say, the pressure of the oil in the chamber 37 will be functionally related to the rotational speed of the common shafting 24 and hence will also be functionally related to the centrifugal force to which the common shafting 24 is being subjected, the oil in the chamber 37 subjecting the side 36 of the piston 34 to a compensating force which is opposed to the centrifugal force to which the common shafting 24 is being subjected.

The pressure in the chamber 37 will thus rise as the rotational speed of the rotor blade 11, and hence the value of centrifugal force, also rises. The pressure in the chamber 37 cannot, however, force the piston 34 an undue distance radially inwardly towards mast 12 since, after the piston 34 has moved a predetermined distance, the valve port 51 will be uncovered and oil will pass from the chamber 37 to the side 53 of the piston 34. The side 53 of the piston 34 will therefore become subjected to a pressure opposing that in the chamber 37 and, at the same time, oil which has passed to the side 53 of the piston 34 will be scavenged by the gear pump 47, 48 and will pass back via the pipe 54 to the oil tank 40.

I claim:

1. A rotor member having a radially inner part about which the rotor member is adapted to be rotated, a gas turbine engine which is arranged to rotate the rotor member and which is carried by a part thereof which is radially spaced from said inner part, the gas turbine engine having compressor means, turbine means, common shafting on which are mounted said compressor and turbine means, and bearings in which said common shafting is rotatably mounted, said bearings being carried by the rotor member and being spaced apart from each other radially of the rotor member, and compensating means for subjecting the common shafting to a compensating force which is opposed to the centrifugal force to which the common shafting is subjected when the rotor member is rotated, said compensating means comprising a cylinder disposed radially outwardly of said engine, a piston slidably mounted in said cylinder and connected to said common shafting for longitudinal movement therewith, a pressure fluid tank disposed radially inwardly of said cylinder and adapted to contain a pressure fluid, and a radially extending conduit which is connected to said pressure fluid tank and to a part of said cylinder which is on the side of said piston remote from said common shafting, for supplying said cylinder with a pressure fluid.

2. A rotor member having a radially inner part about which the rotor member is adapted to be rotated, a gas turbine engine which is arranged to rotate the rotor member and which is carried by a part thereof which is radially spaced from said inner part, the gas turbine engine having compressor means, turbine means, common shafting on which are mounted said compressor and turbine means, and bearings in which said common shafting is rotatably mounted, said bearings being carried by the rotor member and being spaced apart from each other radially of the rotor member, and compensating means for subjecting the common shafting to a compensating force which is opposed to the centrifugal force to which the common shafting is subjected when the rotor member is rotated, said compensating means comprises a cylinder disposed radially outwardly of said engine, a piston slidably mounted in said cylinder and connected to said common shafting for longitudinal movement therewith, a pressure fluid tank disposed radially inwardly of said engine and adapted to contain a pressure fluid, a radially extending conduit which is connected to said pressure fluid tank and to a part of said cylinder which is on the side of said piston remote from said common shafting, for supplying said cylinder with a pressure fluid, and limiting means for limiting the value of the said compensating force.

3. A rotor member having a radially inner part about which the rotor member is adapted to be rotated, a gas turbine engine which is arranged to rotate the rotor member and which is carried by a part thereof which is radially spaced from said inner part, the gas turbine engine having compressor means, turbine means, common shafting on which are mounted said compressor and turbine means, and bearings in which said common shafting is rotatably mounted, said bearings being carried by the rotor member and being spaced apart from each other radially of the rotor member, and compensating means for subjecting the common shafting to a compensating force which is opposed to the centrifugal force to which the common shafting is subjected when the rotor member is rotated, said compensating means comprising a cylinder disposed radially outwardly of said engine, a piston slidably mounted in said cylinder and connected to said common shafting for longitudinal movement therewith, a pressure fluid tank disposed radially inwardly of said cylinder and adapted to contain a pressure fluid, a radially extending conduit which is connected to said pressure fluid tank and to a part of said cylinder which is on the side of said piston remote from said common shafting, for supplying said cylinder with a pressure fluid, and a vent port in said cylinder through which the pressure fluid may escape, the vent port being uncovered by the piston when the latter has moved to a predetermined position in the cylinder whereby the value of the compensating force is limited.

4. A rotor member having a radially inner part about which the rotor member is adapted to be rotated, a gas turbine engine which is arranged to rotate the rotor member and which is carried by a part thereof which is radially spaced from said inner part, the gas turbine engine having compressor means, turbine means, common shafting on which are mounted said compressor and turbine means, and bearings in which said common shafting is rotatably mounted, said bearings being carried by the rotor member and being spaced apart from each other radially of the rotor member, and compensating means for subjecting the common shafting to a compensating force which is opposed to the centrifugal force to which the common shafting is subjected when the rotor member is rotated, said compensating means comprising a cylinder disposed radially outwardly of said engine, a piston slidably mounted in said cylinder and connected to said common shafting for longitudinal movement therewith, a pressure fluid tank disposed radially inwardly of said engine and adapted to contain a pressure fluid, a radially extending conduit which is connected to said pressure fluid tank and to a part of said cylinder which is on the side of said piston remote from said common shafting, for supplying said cylinder with a pressure fluid, and a vent port in said cylinder communicating with the side of said piston adjacent said common shafting and through which the pressure fluid may escape, the vent port being uncovered by the piston when the latter has moved to a predetermined position in the cylinder whereby the value of the compensating force is limited.

5. A rotor member having a radially inner part about which the rotor member is adapted to be rotated, a gas turbine engine which is arranged to rotate the rotor member and which is carried by a part thereof which is radially spaced from said inner part, the gas turbine engine having compressor means, turbine means, common shafting on which are mounted said compressor and turbine means, and bearings in which said common shafting is rotatably mounted, said bearings being carried by the rotor member and being spaced apart from each other radially of the rotor member, and compensating means for subjecting the common shafting to a compensating force which is opposed to the centrifugal force to which the common shafting is subjected when the rotor member is rotated, said compensating means comprising a cylinder disposed radially outwardly of said engine, a piston slidably mounted in said cylinder and connected to said common shafting for longitudinal movement therewith, a pressure fluid tank disposed radially inwardly of said cylinder and adapted to contain a pressure fluid, a radially extending conduit which is connected to said pressure fluid tank and to said cylinder, on the side of the piston remote from the common shafting, a rotatable part which is rotatably mounted in said tank and which is driven by said gas turbine engine, a vent port in said cylinder through which the pressure fluid may escape, and a scavenge pump driven by said rotatable part for withdrawing pressure fluid which has passed through said vent port, the vent port being uncovered by the piston when the latter has moved to a predetermined position in the cylinder whereby the value of said compensating force is limited.

References Cited by the Examiner

UNITED STATES PATENTS

| 2,085,769 | 7/1937 | Scott. | |
| 2,474,359 | 6/1949 | Isacco | 170—135.4 |
| 2,498,911 | 2/1950 | Chittenden | 103—126 |
| 2,516,489 | 7/1950 | Stalker. | |
| 2,594,788 | 4/1952 | Morain | 170—135.4 X |
| 2,627,718 | 2/1953 | Edefelt et al. | 170—135.4 X |
| 2,814,349 | 11/1957 | Berry | 170—135.4 |
| 2,931,441 | 4/1960 | Root | 170—135.4 |
| 3,134,444 | 5/1964 | Egerton et al. | 170—160.25 X |

FOREIGN PATENTS 608,681   9/1948   Great Britain.

EDGAR W. GEOGHEGAN, *Primary Examiner.*

SAMUEL LEVINE, *Examiner.*

E. A. POWELL, *Assistant Examiner.*